(12) United States Patent
Agarwala et al.

(10) Patent No.: US 8,102,428 B2
(45) Date of Patent: Jan. 24, 2012

(54) CONTENT-AWARE VIDEO STABILIZATION

(75) Inventors: Aseem O. Agarwala, Seattle, WA (US); Feng Liu, Madison, WI (US); Hailin Jin, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 527 days.

(21) Appl. No.: 12/276,119

(22) Filed: Nov. 21, 2008

(65) Prior Publication Data

US 2010/0053347 A1 Mar. 4, 2010

Related U.S. Application Data

(60) Provisional application No. 61/092,614, filed on Aug. 28, 2008.

(51) Int. Cl.
 *H04N 5/228* (2006.01)
(52) U.S. Cl. .................................................. 348/208.3
(58) Field of Classification Search ............. 348/208.99, 348/208.1–208.14
See application file for complete search history.

(56) References Cited

U.S. PATENT DOCUMENTS

| | | | |
|---|---|---|---|
| 2004/0252230 A1* | 12/2004 | Winder | 348/402.1 |
| 2005/0280707 A1* | 12/2005 | Sablak et al. | 348/155 |
| 2006/0078162 A1* | 4/2006 | Wonneberger | 348/208.99 |
| 2007/0085927 A1* | 4/2007 | Auberger | 348/402.1 |
| 2007/0263096 A1* | 11/2007 | Bouzar | 348/208.3 |

OTHER PUBLICATIONS

Buehler, et al. "Non-Metric Image-Based Rendering For Video Stabilization" Proceedings of IEEE Comp. society Conference on Computer Vision and Pattern Recognition, 2001.
Gal, et al. "Feature-aware Texturing" School of Computer Science, Tel Aviv University, Israel; Draft version. The original paper appeared in EGSR '06 proceedings.
Avidan, et al. "Seam Carving for Content-Aware Image Resizing" ACM Transactions on Graphics 2007.
Igarashi, et al. "As-Rigid-As-Possible Shape Manipulation" ACM Transactions on Graphics 2005.

* cited by examiner

*Primary Examiner* — Gevell Selby
(74) *Attorney, Agent, or Firm* — Robert C. Kowert; Meyertons, Hood, Kivlin, Kowert & Goetzel, P.C.

(57) ABSTRACT

In one embodiment, a method comprises receiving a source video sequence; determining a stabilized camera path to which the source video sequence is to be stabilized; and generating a stabilized video sequence, wherein each frame of the stabilized video sequence is generated as a content-aware warp of a corresponding frame in the input sequence.

24 Claims, 7 Drawing Sheets

$$E_d(\hat{V}) = \sum_{P_k \in F} \left\| \hat{P}_k - P_k^t \right\|_2^2 \quad (1)$$

$$P_k = \sum_{V_{i,j} \in C_k} w_{i,j} V_{i,j} \quad (2)$$

$$\hat{P}_k = \sum_{\hat{V}_{i,j} \in \hat{C}_k} w_{i,j} \hat{V}_{i,j} \quad (3)$$

$$V_1 = V_2 + R_{90} \overrightarrow{V_2 V_3}, where R_{90} = \begin{bmatrix} 0 & 1 \\ -1 & 0 \end{bmatrix} \quad (4)$$

$$V_1^d = \hat{V}_2 + R_{90} \overrightarrow{\hat{V}_2 \hat{V}_3}, where R_{90} = \begin{bmatrix} 0 & 1 \\ -1 & 0 \end{bmatrix} \quad (5)$$

$$E_{sim}(\hat{V}) = \sum_{C_k} \sum_{\hat{V}_{i,j} \in C_k} \left\| \hat{V}_{i,j} - V_{i,j}^d \right\|_2^2 \quad (6)$$

$$\lambda_k = \sum_{P_i, P_j \in C_k} \left\| I(P_i) - I(P_j) \right\| / csize^2 \quad (7)$$

$$E_{sim}(\hat{V}) = \sum_{C_k} (\lambda_k + \in) \sum_{\hat{V}_{i,j} \in C_k} \left\| \hat{V}_{i,j} - V_{i,j}^d \right\|_2^2 \quad (8)$$

$$E(\hat{V}) = \alpha E_d(\hat{V}) + \beta E_{sim}(\hat{V}) \quad (9)$$

$$i(t) = \begin{cases} (t - t_a)/T, & t - t_a \leq T \\ 1, & T < t < t_e - T \\ (t_e - t)/T, & t \geq t_e - T \end{cases} \quad (10)$$

$$E_d(\hat{V}(t)) = \sum_{P_k \in F} i_k(t) \left\| \hat{P}_k - P_k^t \right\|_2^2 \quad (11)$$

Fig. 11

CONTENT-AWARE VIDEO STABILIZATION

This application claims benefit of priority to U.S. Provisional Patent Application Ser. No. 61/092,614, filed on Aug. 28, 2008. The Provisional Patent Application is incorporated herein by reference. To the extent that anything in the Provisional Patent Application contradicts material expressly included herein, the material herein controls.

BACKGROUND

1. Field of the Invention

This invention is related to the field of video processing and, more particularly, to stabilizing a video.

2. Description of the Related Art

When a camera user captures a video sequence using equipment that is not as sophisticated as that used by professional movie production companies, the resulting video sequence typically includes a certain amount of "shakiness" that is caused by undesired camera motions. For example, the user's hand movements or walking motion, vibrations in a vehicle in which the user may be riding, or vibrations or imperfect movements of an apparatus to which the camera is mounted are all possible sources of undesired camera motions. The camera's motion through the three dimensional (3D) space can also be a source of undesired camera motion, e.g., due to the user walking an imperfect line, or riding in a vehicle that does not travel a straight line.

Some cameras have a built-in feature to attempt to compensate for unstable camera motions while the video is being captured. Typically, such cameras attempt to identify multiple points in the frames of the video and track those points from frame to frame. The cameras fit a motion model to the points, and apply an affine warp to the video based on the motion model. The cameras often also apply a low pass filter to the video to attempt to smooth the results. While the camera motion can be damped by such techniques, the resulting video still includes significant undesired camera motion. Additionally, the affine warp does not respect the content of the frames, often producing distortion in the images and particularly producing distortion in the most visually interesting objects in the video.

Buehler et al., "Non-Metric Image-Based Rendering for Video Stabilization", proposed a mechanism for video stabilization that includes blending multiple frames from the video to produce an output frame. The Buehler mechanism works well for static scenes, but leads to ghosting and blurring of videos that include dynamic motion in the scene due to the blending of the multiple frames.

SUMMARY

In one embodiment, a method comprises receiving a source video sequence; determining a stabilized camera path to which the source video sequence is to be stabilized; and generating a stabilized video sequence, wherein each frame of the stabilized video sequence is generated as a content-aware warp of a corresponding frame in the input sequence.

In an embodiment, a method comprises receiving a source video sequence; generating a metric reconstruction of an original camera path from the source video sequence; determining a stabilized camera path to which the source video sequence is to be stabilized; and generating a stabilized video sequence, wherein a frame at each given time point in the stabilized video sequence is derived from only a corresponding frame at the given time point in the source video sequence.

BRIEF DESCRIPTION OF THE DRAWINGS

FIG. 11 illustrates various equations that may be used in one embodiment.

Figure 1:
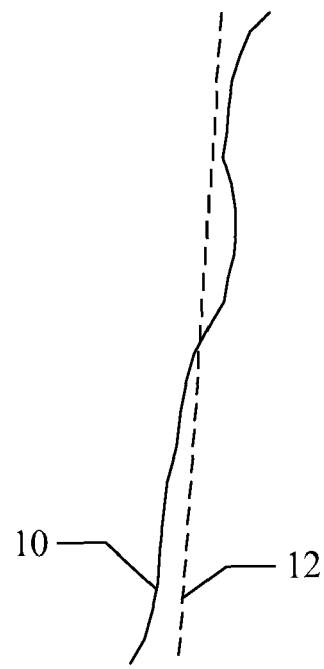
FIG. 1 illustrates an exemplary actual camera path for a video sequence and an exemplary stabilized camera path.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter. Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is generally considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these terms or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, other information storage devices, transmission devices, or display devices of the special purpose computer or similar special purpose electronic computing device.

Various embodiments of a method and apparatus for performing video stabilization are described. Specifically, embodiments may perform video stabilization in a content-aware fashion. An input video taken by an actual camera may include undesired camera shaking, e.g., due to the user's hand movements or walking motion, vibrations in a vehicle in which the user may be riding, or vibrations or imperfect movements of an apparatus to which the camera is mounted. Undesired movements in the input video may also result from capturing the video on an imperfect camera path through the three dimensional (3D) space, e.g., due to the user walking an imperfect line, or riding in a vehicle that does not travel a straight line. Other sources of imperfect camera motion may also be present. The input video taken by the actual camera may be referred to herein as the source video.

In order to correct for the effects of camera movement irregularities, a video stabilization process may be performed on the source video. The video stabilization process may attempt to create a stabilized camera path through the 3D space. The stabilized path may make the stabilized video appear to have a more "professional" camera motion that often requires special camera mounting equipment and other apparatus designed to provide a smooth camera motion. The output video from the video stabilization process may be referred to herein as the "stabilized video."

In one embodiment, each frame in the stabilized video may be derived from exactly one frame in the source video. Specifically, the stabilized frame for a time "t" in the stabilized video may be derived from a source frame at time "t" in the source video. Accordingly, the stabilized video may contain essentially any amount of dynamic content without exhibiting ghosting or blurring effects, in one embodiment. A content-aware warp of the source frame may be performed, projecting the scene at the time "t" into the stabilized camera based on the projection of the scene at the same time "t" into the source camera. The warp is content-aware in that it attempts to maintain as much as possible the original characteristics of the objects in the scene that are most likely to be noticeable to a viewer. Various methods of measuring the "salience" of each point in the frame image may be used to determine the points that should by maintained as much as possible. That is, points having a high salience may carry more information to the viewer or may be more noticeable to the viewer than points having a low salience.

Generally, a video (or video sequence) may comprise a series of frames that have a temporal relationship to each other. Each frame comprises an image of a 3D scene taken at a specific time relative to the other frames. When viewed in the temporal order, the video sequence depicts the scene in motion from a time to corresponding to the first frame to a time $t_n$ corresponding to the $(n+1)^{th}$ frame. If viewed in real time (e.g. each frame shown at its corresponding relative time, at a speed of, e.g., 30 frames per second or more), the video illustrates the scene that would be viewed by a person that was actually there, viewing the scene from the same orientation and along the same path as the source camera.

Turning now to FIG. 1, a block diagram is shown illustrating an exemplary actual camera path 10 and a corresponding stabilized path 12 that has been fit to the actual camera path 10. The actual camera path 10 is illustrated as a solid line, and the stabilized path 12 is illustrated as a dotted line. As can be seen in FIG. 1, the actual camera path 10 may include various undesired movements that may cause the actual video sequence taken by the actual camera to exhibit undesired instability as compared to the smoother stabilized path 12. Note that both the actual camera path 10 and the stabilized path 12 may be paths in 3D space. In some embodiments, the paths 10 and 12 may also include additional camera motions beyond the 3D translation of the camera along the path (e.g. orientation and rotation of the camera, for example).

The stabilized path 12 may be a path having a desired equation in 3D space that best fits the actual camera path 10. In FIG. 1, a line in 3D space is fit to the actual camera path. The stabilized path 12 may be the path that meets the desired equation and that exhibits the least squares error with the actual camera path 10. While a line is show in this example, other examples may use a curve for the stabilized path 12. For example, a quadratic equation may be used to define a stabilized path 12. Any desired equation may be used to defined the stabilized path 12 to be fit to the actual camera path 10.

Figure 2:
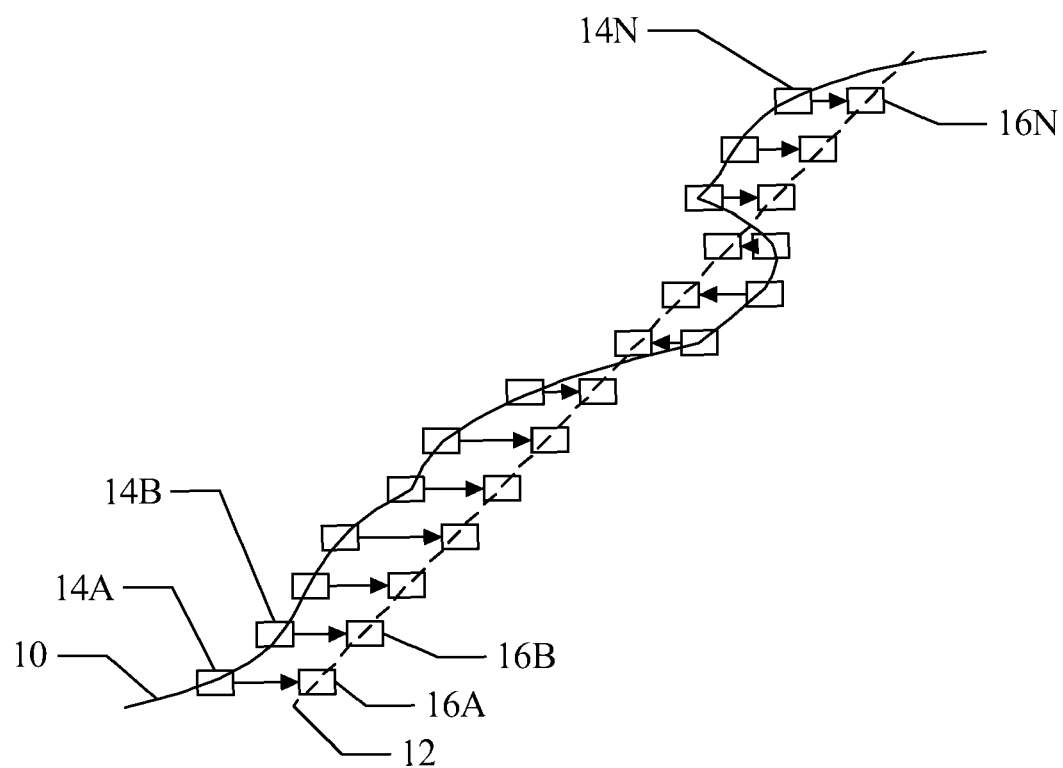
FIG. 2 is a stretched view of FIG. 1, illustrating frames from the actual camera path and the generation of stabilized frames on the stabilized camera path from the actual frames.

FIG. 2 is a block diagram showing a view of the actual camera path 10 and the stabilized path 12, stretched from the view of FIG. 1 to exaggerate the differences between the paths so the frames along the path can be illustrated. Frames of the source video are illustrated at the points along the path 12 at which the frames were taken (e.g. source frames 14A, 14B, etc. to 14N in FIG. 2). Any number of frames may be included in the source video, depending on the frame rate (e.g. 30 frames/second or more) and the length of time over which the actual camera path 12 was traversed. Corresponding stabilized frames in the stabilized video are illustrated along the stabilized path 12 (e.g. frames 16A, 16B, etc. to 16N in FIG. 2). As illustrated by the horizontal arrows from each source frame 14A-14N and the corresponding stabilized frame 16A-16N, each stabilized frame may be derived from the source frame that has the same time point in the source video as the stabilized frame has in the stabilized video. The difference in space between the source frame and the stabilized frame may be small for most frames, since the stabilized path has been fit to the actual camera path. Accordingly, for most frames, the amount of change in the source frame to generate the stabilized frame may be relatively small. By performing the change (or "warp") of the source frame in a content-aware fashion, the change may be less noticeable to a viewer, except that the stabilized video may exhibit a smoother camera motion.

Figure 3:
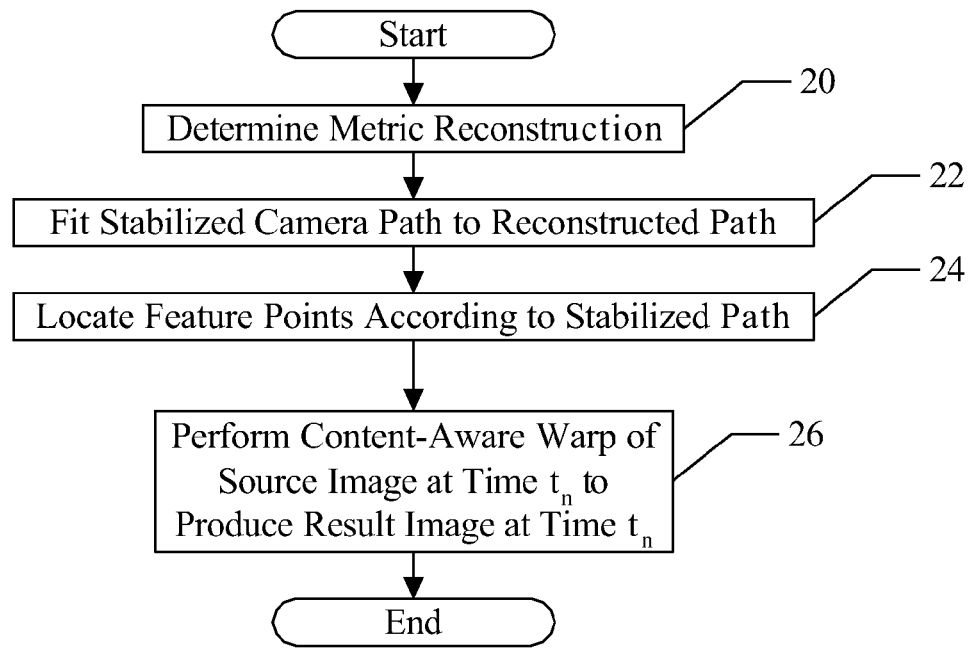
FIG. 3 is a flowchart illustrating one embodiment of video stabilization.

Turning next to FIG. 3, a flowchart is shown illustrating one embodiment of a video stabilization method/process. In some embodiments, a portion or all of the video stabilization process may be implemented by execution of instructions on a computer or computers. Thus, a block or blocks in FIG. 3 may be implemented by one or more instructions executed on a computer.

The video stabilization process may include determining a metric reconstruction of the source camera which captured the source video (block 20). That is, based on the images in the source video, the parameters of the source camera may be recreated. The parameters of the camera may include the position of the camera in 3D space at the time each image is captured (from which the actual camera path 10 may be inferred, to the granularity of the frame rate of the camera). The metric reconstruction may also include other camera parameters, such as the orientation of the camera, its rotation, focal length, etc. As opposed to a non-metric reconstruction, the camera parameters in a metric reconstruction may be provided as separate numerical entities in a metric reconstruction. In a non-metric reconstruction, at least some of the camera parameters are not directly determined and thus some of the camera information is not directly available for subsequent processing.

The metric reconstruction may further include a set of feature points that were reconstructed in 3D space based on the frame images. In general, features may comprise any identifiable structures in the images. For example, features may comprise one or more of points, lines, curves, surfaces, etc., in various embodiments. The reconstruction may include feature matching between various images, and generating feature correspondences between the images. The feature correspondences may identify the images for which the correspondence is detected, as well as the location of the matched feature in each image. The feature correspondences may further include other information regarding the features (e.g. color, data describing the gradient in the image near the features, etc.). From the feature correspondences across multiple images, the 3D points and camera parameters may be reconstructed. A set of feature points may be associated with each image in the source video. Sets of feature points between neighboring images in the video may overlap, but feature points may also appear and disappear from image to image.

The metric reconstruction may be determined in any desired fashion. For example, any structure from motion algorithm may be used to obtain the metric reconstruction. In one embodiment, for example, the VooDoo camera tracker available from the University of Hannover's Laboratorium für Informationstechnologie may be used. Other embodiments may use any structure from motion tool, including any of the commercially available tools from numerous vendors.

As mentioned above, the metric reconstruction provides a set of camera locations in the 3D space, which indicate the actual camera path within the granularity of the frame rate. The video stabilization process may fit a stabilized path to the actual camera path (block 22). As mentioned above, various embodiments may use linear or curved stabilized paths. In some embodiments, the video stabilization process may fit multiple stabilized camera paths to the actual camera path, and may select the stabilized path that has the least error in fitting to the actual camera path.

The video stabilization process may further include, for each image, locating the feature points identified from the source image according to the stabilized image (block 24). That is, based on moving the camera position from its reconstructed position on the actual camera path to the corresponding point on the stabilized path, the location of the feature points in the corresponding image may change. Effectively, the change in location is the difference in the projection of the 3D points into the actual camera and into the stabilized camera.

The video stabilization process further includes a content-aware warp of the images in the source video to produce stabilized images in the stabilized video (block 26). The source image at a time $t_n$ in the source video is used to generate the corresponding stabilized (result) image at the time $t_n$ in the stabilized video. A warp may refer to any modification in the position of the pixels in an image.

Figure 4:
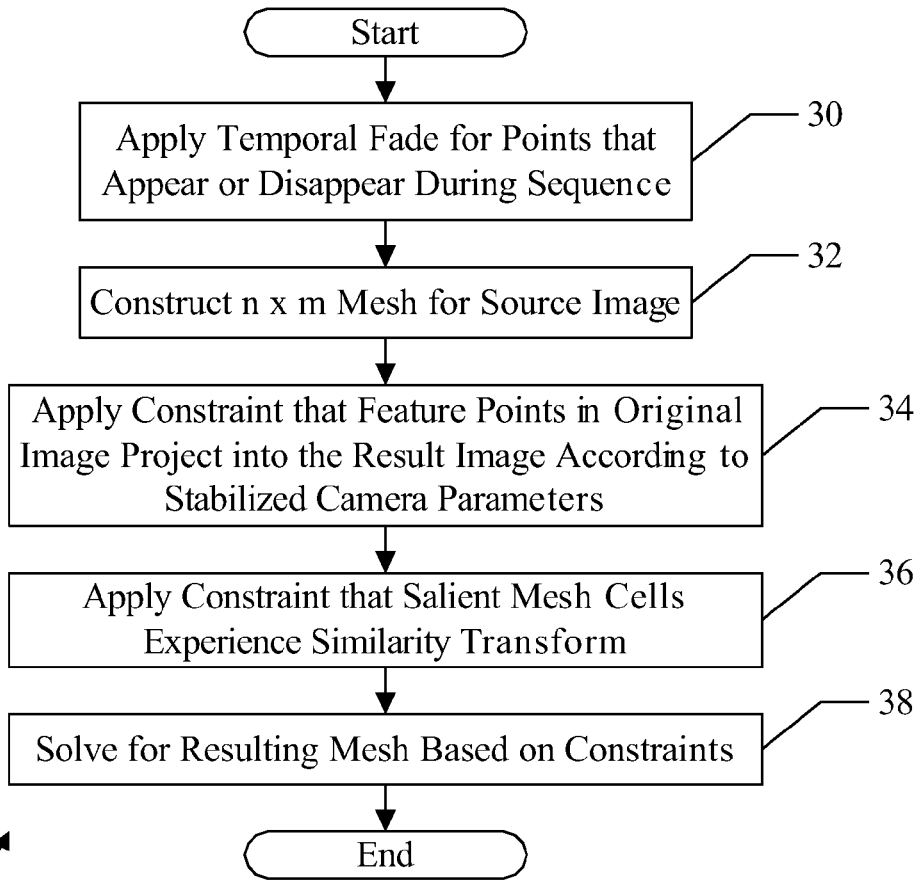
FIG. 4 is a flowchart illustrating one embodiment of a block from FIG. 3 in greater detail.

FIG. 4 is a flowchart illustrating one embodiment of content-aware warp operation (block 26 in FIG. 2) in more detail. In some embodiments, a portion or all of a block or blocks in FIG. 4 may be implemented by one or more instructions executed on a computer.

As mentioned previously, the set of feature points identified in the reconstruction and used in the video stabilization process may change from frame to frame, including the appearance or disappearance of points in the set. That is, a feature point that wasn't included in the feature point set for a preceding frame may be included in the feature point set of a particular frame, "appearing" in the set. Similarly, a feature point that was included in the feature point set for a preceding frame may not be included in the particular frame, "disappearing" from the set. It is possible that the abrupt appearance or disappearance of feature points may introduce an immediate change in the image warping, which may cause a jerkiness in the stabilized video. To reduce or prevent this effect, in some embodiments, the video stabilization process may include applying a temporal fade for points that appear or disappear during the sequence (block 30). That is, a point that appears in the sequence at a particular frame may be faded into the sequence for several frames near that particular frame (either before, after, or a combination of frames before and after the particular frame). Similarly, a feature point that disappears in the particular frame may be faded out of the sequence over several frames near the particular frame. By fading the point in and out, its effect on the video stabilization process may gradually increase and decrease, respectively, which may reduce or eliminate any jerkiness in the resulting stabilized video due to the addition or deletion of the feature point.

Figure 5:
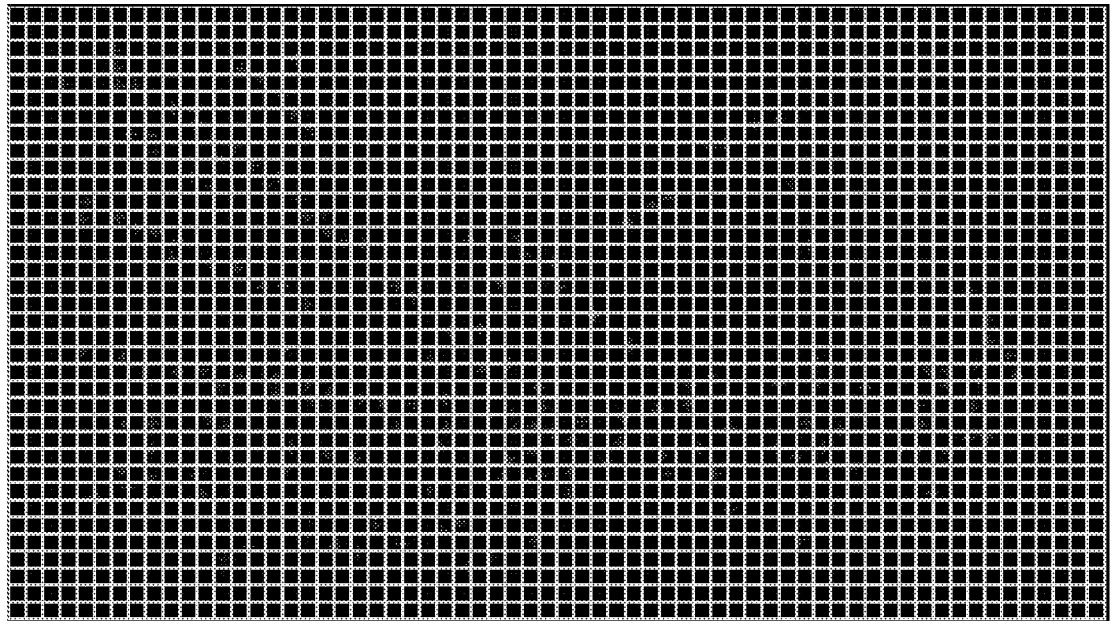
FIG. 5 is an example of a mesh defined for an original image.

The video stabilization process may further include constructing an n x m mesh over the source image (where n and m are both integers, and can be any up to the pixel resolution of the image) (block 32). Each cell in the mesh may comprise a set of pixels of the source image that are encompassed by the mesh. FIG. 5 is a block diagram of an exemplary mesh that could be applied to an image.

Some of the mesh cells will include the feature points identified in the metric reconstruction. Accordingly, the video stabilization process may apply a constraint to the warp that the mesh cells containing the feature points be moved to positions that place the feature points in the correct locations in the stabilized frame (according to the stabilized camera parameters), as calculated in block 24 described above (block 34). Because the feature points in general may not be on a vertex of the mesh, a bi-linear interpolation of the vertices of the mesh cell containing the feature point may be used in the constraint.

Additionally, the warp is made content aware by applying a constraint that mesh cells with high salience experience a transformation into the stabilized frame that respects the structure of the mesh cell (block 36). For example, the constraint may be a similarity transformation, in which the cell is translated (horizontal and/or vertical movement) and possibly scaled and/or rotated. Other embodiments may constrain cells with high salience to a rigid transformation (translation and possible rotation, no scaling) or a translation transformation (translation only). Cells with lower salience may experience more significant transformations (e.g. the cell shape may be deformed).

Salience may be measured in a variety of fashions. Generally, it may be desirable to assign higher salience to cells that are part of an object in the scene that will draw the eye of the viewer. Viewed in another way, cells with higher salience may carry more visual information than cells with lower salience. For example, in one embodiment, the color variance across the cell is measured. Cells with high color variance may include significant visual information, and thus may be considered more salient. Cells with lower color variance (that is, cells that are closer to being the same color across the cell) may have less visual information and may be distorted more in the warp without being as visually noticeable. Other methods that measure salience may be used in other embodiments. For example, the objects at the center of an image are frequently the most visually interesting (e.g. video is usually shot with the most interesting part of the scene near the center of the image). Accordingly, mesh cells near the center may be assigned a higher salience that those nearer the edges of the image. Combinations of various salience measures may also be used.

Figure 6:
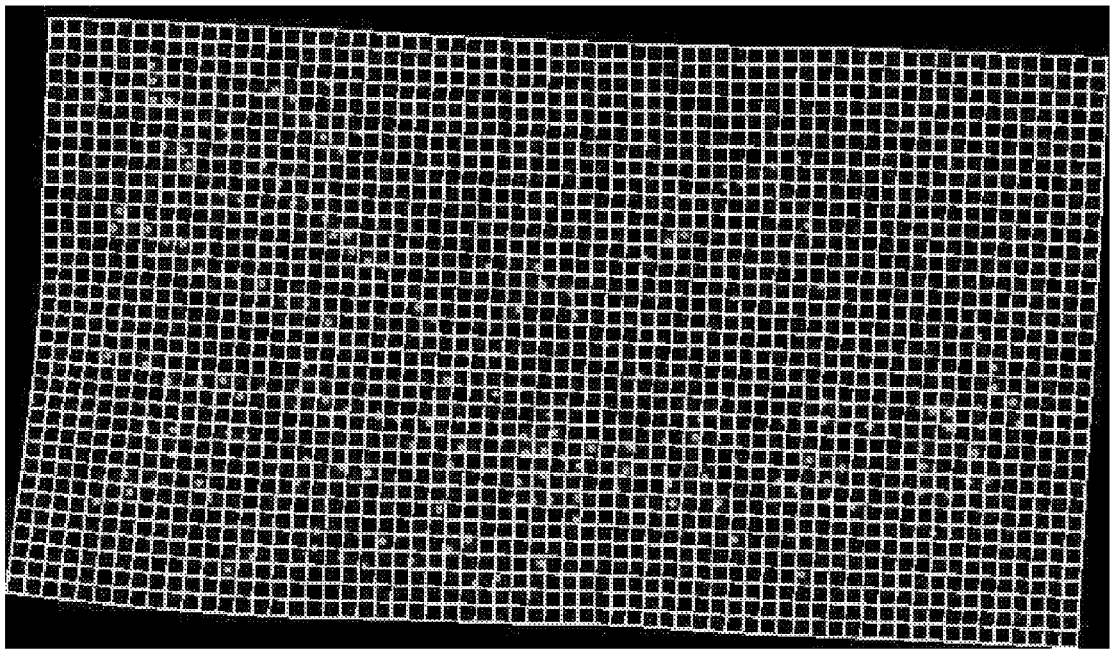
FIG. 6 is an example of a warped mesh for a corresponding stabilized image.

The video stabilization process may then solve the mesh cells across the constraints to produce the warped image for the stabilized video (block 38). An example of a warped resulting mesh is illustrated in FIG. 6. The constraints may not be able to be met exactly. Generally, the video stabilization process may "encourage" the constraints to be met. That is, the process may attempt to find the best fit, in a least squares sense, for the points in the image based on the constraints.

Figure 7:
FIG. 7 is an example image from an example source video.
Figure 8:
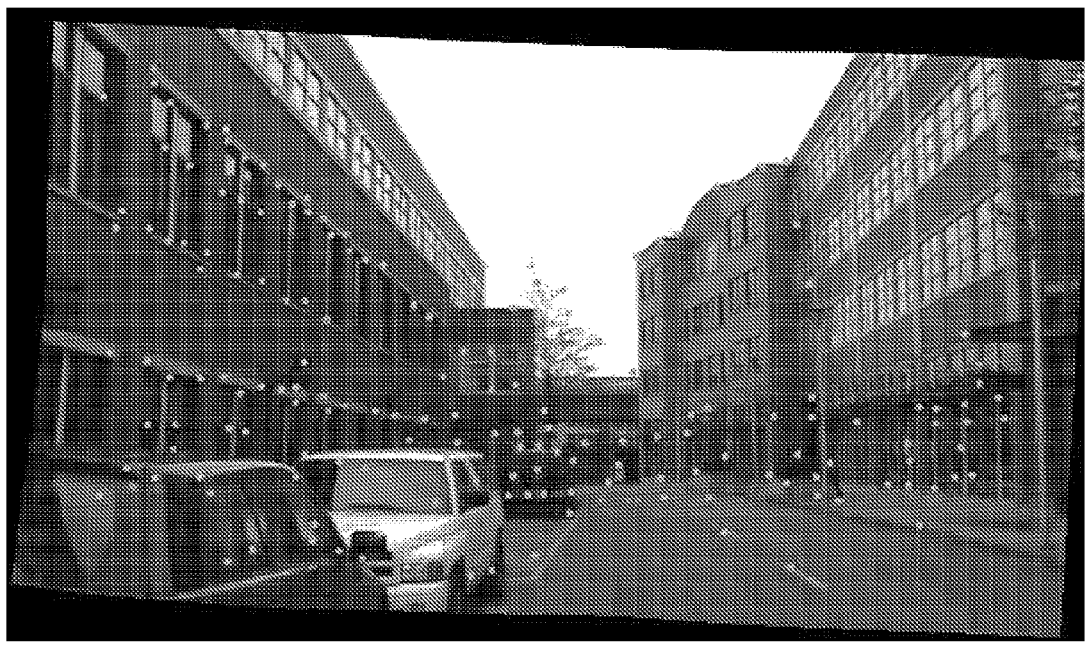
FIG. 8 is an example of an image warped with the mesh shown in FIG. 6.

FIGS. 7 and 8 illustrate one example of before and after images based on the above described process. FIG. 7 is the "before" image, from a frame of the source video. FIG. 8 is the same frame for the stabilized video. Various feature points that were used in the warping process are illustrated as white dots in FIG. 8, and the white dots are not part of the resulting image. It is noted that the image of FIG. 8 has some black areas around the edges and is not rectangular like the source image of FIG. 7. In one embodiment, the image may be cropped to produce the image used in the stabilized video. For example, the video stabilization process may crop the image to a maximum-sized rectangle that fits within the warped image boundaries. Other embodiments may use various hole filling algorithms or other image extension techniques to fill the black areas introduced by the warping.

Figure 9:
FIG. 9 is an example of an image warped without salience weighting.
Figure 10:
FIG. 10 is an example of an image warped with salience weighting.

FIG. 9 is an example of warping in which the mesh cells are not weighted by salience and without urging higher salience mesh cells to undergo similarity transformation. A rectangle on the left side of the image (reference numeral 40) illustrates two windows with vertical bars that are bent in a noticeable fashion that does not appear natural. In FIG. 10, an example in which salience weighting is used in the warp, the window bars are more straight (rectangle indicated by reference numeral 42).

It is noted that, in general, moving the view point of a frame from the source camera to the stabilized camera may include revealing features of the original scene that were not captured on the source video. Such revelations are referred to as disoclusions. In one embodiment, the video stabilization process may not attempt to handle disoclusions, but may instead attempt to warp the captured image in a naturally-looking fashion.

FIG. 11 illustrates a set of equations that may be used, in one embodiment, to accomplish the content-aware warping of block 26 in FIG. 3. As noted above, from the location of the feature points in the stabilized frame are known (including points to which the fade in or fade out is being applied, as described about with regard to block 30). Accordingly the goal of warping may be to transform each source video frame such that the feature points are moved to their desired positions while introducing minimal visual distortions.

In the equations, the source frame at a given time is denoted I and the stabilized frame is denoted $\hat{I}$. If desired, I and $\hat{I}$ may be augmented with a time reference to denote frames at different times. The set of vertices of the mesh described above may be represented as $V=\{V_{i,j}\}$, where i is an element of [1; n] and j is an element of [1;m]}. Using this grid mesh parameterization, the warping problem may be reduced to finding the mesh in the stabilized video frame $\hat{I}$, denoted in the equations as $\hat{V}=\{\hat{V}_{i,j}\}$, where i is an element of [1; n] and j is an element of [1;m]}. That is, the warping problem may be an optimization problem to find the $\hat{V}$ grid that best meets the goals of the warp (content awareness via the salience and transformation from the source camera view point to the stabilized camera view point).

Equations 1 to 3 illustrate the warping goal of transforming the source view point to the stabilized view point. Equation 1 is the energy equation to be solved for. Equations 2 and 3 define the variables $P_k$ and $\hat{P}_k$ according to the bi-linear interpolation of feature points to surrounding grid vertices. That is, $P_k$ and $\hat{P}_k$ are the $k^{th}$ feature points of I and $\hat{I}$, respectively, $P^t_k$ is the feature point according to the stabilized path, F is the feature point set, and $C_k$ is the grid cell that includes $P_k$, and $w_{i,j}$ are the bi-linear interpolation coefficients.

To avoid visual distortion, each mesh cell may be encouraged to undergo similarity transformation. Each vertex of the mesh cell may be calculated using its two neighboring points. For example, $V_1$ (the upper left vertex of a cell) can be defined using $V_2$ and $V_3$ (the lower left and lower right vertexes in the same mesh cell) as illustrated in equation 4. After similarity transformation, the same method can be used to calculate $\hat{V}_1$ using $\hat{V}_2$ and $\hat{V}_3$. However, since other constraints are also to be met, $\hat{V}_1$ may not be at the ideal position. The ideal position, denoted $\hat{V}^d_1$, is defined in equation 5. Similarly, the ideal position of the other 3 vertices of the mesh cell made be defined. To conform to the similarity transform constraint, the actual vertices $\hat{V}$ may be encourage toward the ideal position as illustrated in equation 6, where $C_k$ is the $k^{th}$ grid cell, $\hat{V}_{i,j}$ is one of the four vertices of $C_k$, and $V^d_{i,j}$ is the ideal position of vertex $\hat{V}_{i,j}$ according to the similarity transformation.

In the illustrated embodiment, the saliency is measured as the color variance inside the cell and is used to weight the similarity transformation constraint for each cell. Equations 7 and 8 illustrate this, where $\lambda_k$ is the saliency measure of $C_k$, $I(P_i)$ is the color at $P_i$, and csize is the size of the cell. Epsilon in equation 8 is a constant, with a default value (e.g., 0.5) to ensure that each cell is subject to a similarity constraint.

Based on the above, the warp may be formulated as an optimization problem aiming at minimizing equation 9, where alpha and beta are parameters, with default values of, e.g., 100 and 1 respectively. Alpha weights the translation constraint and beta weights the similarity constraint. Other embodiments may use other weights (e.g. the user may experiment with the weights and select the most visually appealing result). The energy terms to be minimized are quadratic (least-squares) in this embodiment. Accordingly, quadratic minimization is performed to solve the optimization problem. The quadratic minimization may be solved in any fashion. For example, in an embodiment, the quadratic minimization may be solved to a global minimum by solving a single, sparse linear system. The linear system is formed by placing the constraints into a single matrix, and then forming the "normal equations" for least squares analysis. Any linear-system solver may be used.

Equation 10 illustrates one embodiment of fading in and fading out points over a time T that may be selected, e.g., as a multiple of the frame rate. In equation 10, $t_a$ may be the time of the frame in which the feature point appears and $t_e$ is the time of the frame at which the feature point disappears. Points that only appear and points that only disappear may be subsets of equation 10. Using equation 10, equation 1 may be rewritten as shown in equation 11.

Exemplary System

Figure 12:
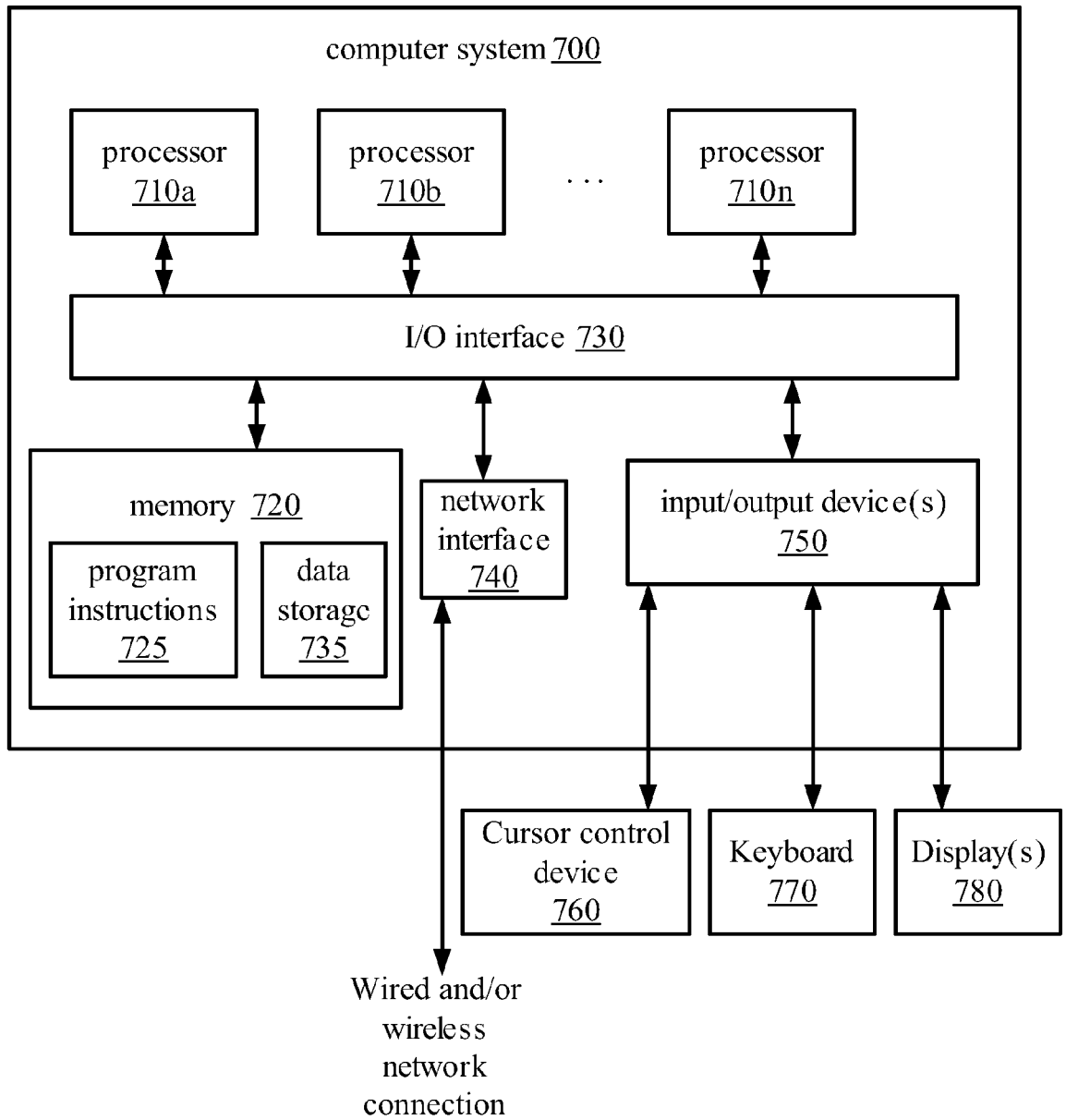
FIG. 12 illustrates an exemplary computer system that may be used in embodiments.

Various components of embodiments of a method and apparatus for content-aware video stabilization and other uses may be executed on one or more computer systems, which may interact with various other devices. One such computer system is illustrated by FIG. 12. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, audio device 790, and display(s) 780. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired operations, such as those described above, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 12, memory 720 may include program instructions 725, configured to implement embodiments of a method and apparatus described above, and data storage 735, comprising various data accessible by program instructions 725. In one embodiment, program instructions 725 may include software elements of a method and apparatus described above. Data storage 735 may include data that may be used in embodiments. In other embodiments, other or different software elements and data may be included.

In some embodiments, the computer system 700 may also include a graphics processing unit (GPU). The GPU may be optimized for graphics processing (e.g. for generating images to be displayed on a display screen connected to the computer system 700). The GPU may be programmable with program instructions according to the instruction set implemented by the GPU (e.g. instruction sets developed by graphics manufacturers such as NVIDIA or ATI). In some embodiments, the GPU may have a private, dedicated memory accessible only to the GPU. The program instructions may be stored in the private memory, in one embodiment. In one embodiment, the GPU may execute program instructions to implement some or all of the method describe herein.

Those skilled in the art will appreciate that computer system 700 is merely illustrative and is not intended to limit the scope of a method and apparatus as described herein. In particular, the computer system and devices may include any combination of hardware or software that can perform the indicated functions, including computers, network devices, internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Conclusion

The various methods as illustrated in the drawings and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
   receiving a source video sequence;
   determining a stabilized camera path to which the source video sequence is to be stabilized; and
   generating a stabilized video sequence,
      wherein each frame of the stabilized video sequence is generated as a content-aware warp of a corresponding frame in the source video sequence, and
      wherein said content-aware warp is based on a salience measure for each of a plurality of areas of the corresponding frame.

2. The method as recited in claim 1 further comprising generating a metric reconstruction of an original camera path corresponding to the camera that captured the source video sequence.

3. The method as recited in claim 2 wherein generating the stabilized video sequence comprises dividing each source video sequence frame into a mesh of cells, and wherein the content aware-warp comprises: (i) encouraging cells that contain feature points identified in the metric reconstruction to move to locations that position the feature points in the frame on the stabilized camera path; and (ii) encouraging cells having salient content to experience a transform into the frame on the stabilized camera path that respects the structure of the cells.

4. The method as recited in claim 3 wherein the transform is a similarity transform.

5. The method as recited in claim 4 further comprising determining a salience measure for each cell to identify cells having salient content.

6. The method as recited in claim 5 wherein the salience measure is based on color variation in the cell, wherein high color variation indicates high salience and low color variation indicates low salience.

7. The method as recited in claim 1 wherein determining the stabilized camera path comprises fitting a desired camera path to the original camera path.

8. The method as recited in claim 7 wherein the desired camera path is a line.

9. The method as recited in claim 7 wherein the desired camera path is a curve.

10. The method as recited in claim 1 wherein generating the stabilized video sequence comprises cropping at least one frame subsequent to the content-aware warp.

11. The method as recited in claim 1 wherein generating the stabilized video sequence comprises extending at least one frame subsequent to the content-aware warp using one or more image extension techniques.

12. A computer accessible storage medium storing a plurality of instructions which, when executed:
   receive a source video sequence;
   determine a stabilized camera path to which the source video sequence is to be stabilized; and
   generate a stabilized video sequence,
      wherein each frame of the stabilized video sequence is generated as a content-aware warp of a corresponding frame in the source video sequence, and
      wherein said content-aware warp is based on a salience measure for each of a plurality of areas of the corresponding frame.

13. The computer accessible storage medium as recited in claim 12 wherein the plurality of instructions, when executed, generate a metric reconstruction of an original camera path corresponding to the camera that captured the source video sequence.

14. The computer accessible storage medium as recited in claim 13 wherein the plurality of instructions which, when executed, generate the stabilized video sequence comprise instructions which, when executed, divide each source video sequence frame into a mesh of cells, and wherein the content aware-warp comprises: (i) encouraging cells that contain feature points identified in the metric reconstruction to move to locations that position the feature points in the frame on the stabilized camera path; and (ii) encouraging cells having salient content to experience a transform into the frame on the stabilized camera path that respects the structure of the cells.

15. The computer accessible storage medium as recited in claim 14 wherein the transform is a similarity transform.

16. The computer accessible storage medium as recited in claim 15 wherein the plurality of instructions, when executed, determine a salience measure for each cell to identify cells having salient content.

17. The computer accessible storage medium as recited in claim 16 wherein the salience measure is based on color variation in the cell, wherein high color variation indicates high salience and low color variation indicates low salience.

18. The computer accessible storage medium as cited in claim 12 wherein the plurality of instructions which, when executed, determines the stabilized camera path comprise instructions which, when executed, fit a desired camera path to the original camera path.

19. The computer accessible storage medium as recited in claim 18 wherein the desired camera path is a line.

20. The computer accessible storage medium as recited in claim 18 wherein the desired camera path is a curve.

21. The computer accessible storage medium as recited in claim 12 wherein the plurality of instructions which, when executed, generate the stabilized video sequence comprise instructions which, when executed, crop at least one frame subsequent to the content-aware warp.

22. The computer accessible storage medium as recited in claim 12 wherein the plurality of instructions which, when executed, generate the stabilized video sequence comprise instructions which, when executed, extend at least one frame subsequent to the content-aware warp using one or more image extension techniques.

23. A method, comprising:
receiving a source video sequence;
generating a metric reconstruction of an original camera path from the source video sequence;
determining a stabilized camera path to which the source video sequence is to be stabilized; and
generating a stabilized video sequence, wherein a frame at each given time point in the stabilized video sequence is derived from only a single corresponding frame at the given time point in the source video sequence and according to a difference between the metric reconstruction of the original path and the stabilized camera path at the corresponding frame.

24. A computer-implemented method, comprising:
executing instructions on a specific apparatus so that binary digital electronic signals representing a source video sequence are received;
executing instructions on a specific apparatus so that binary digital electronic signals representing a stabilized camera path to which the source video sequence is to be stabilized are determined; and
executing instructions on a specific apparatus so that binary digital electronic signals representing a stabilized video sequence are generated,
wherein each frame of the stabilized video sequence is generated as a content-aware warp of a corresponding frame in the source video sequence, and
wherein said content-aware warp is based on a salience measure for each of a plurality of areas of the corresponding frame; and
storing the stabilized video sequence in a memory location of the specific apparatus.

* * * * *